US010644766B2

United States Patent
Qu et al.

(10) Patent No.: US 10,644,766 B2
(45) Date of Patent: *May 5, 2020

(54) MIMO (MULTIPLE-INPUT, MULTIPLE-OUTPUT) INTER-STREAM INTERFERENCE CANCELLATION

(71) Applicant: Facebook, Inc., Menlo Park, CA (US)

(72) Inventors: Qi Qu, Irvine, CA (US); Sam Padinjaremannil Alex, Dublin, CA (US); Ali Yazdan, San Francisco, CA (US); Abhishek Tiwari, Woodland Hills, CA (US); Yan Yan, Culver City, CA (US); Hongyu Zhou, Canoga Park, CA (US); Pratheep Bondalapati, Woodland Hills, CA (US)

(73) Assignee: Facebook, Inc., Menlo Park, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/110,397

(22) Filed: Aug. 23, 2018

(65) Prior Publication Data
US 2019/0013845 A1    Jan. 10, 2019

Related U.S. Application Data

(63) Continuation of application No. 15/389,608, filed on Dec. 23, 2016, now Pat. No. 10,084,518.

(51) Int. Cl.
*H04B 7/0456* (2017.01)
*H01Q 1/28* (2006.01)
(Continued)

(52) U.S. Cl.
CPC ........... *H04B 7/0456* (2013.01); *H01Q 1/288* (2013.01); *H01Q 21/28* (2013.01); *H04B 7/06* (2013.01); *H04B 7/08* (2013.01)

(58) Field of Classification Search
CPC ...... H04B 7/0413; H04B 7/0456; H04B 7/06; H04B 7/08; H04B 1/0475; H04B 1/0483;
(Continued)

(56) References Cited

U.S. PATENT DOCUMENTS 7,110,378 B2    9/2006  Onggosanusi et al.
10,084,518 B2 *  9/2018  Qu ........................... H04B 7/08
(Continued)

OTHER PUBLICATIONS

Notification of Transmittal of the International Search Report and the Written Opinion of the International Searching Authority, or the Declaration, PCT/US18/37306, International Filing Date Jun. 13, 2018, dated Aug. 27, 2018.

*Primary Examiner* — Betsy Deppe
(74) *Attorney, Agent, or Firm* — Brian R. Short

(57) ABSTRACT

Apparatuses, methods, and systems for MIMO inter-stream interference cancellation are disclosed. One method includes determining a channel matrix between a plurality of transmitting antennas of a transmitter and a plurality of receiving antennas of a receiver, determining a plurality of channel propagation delays based on a propagation delay between each of the plurality of transmitting antennas and each of the plurality of receiving antennas, determining differences in the plurality of channel propagation delays, preprocessing, by the transmitter, streams of symbols for each transmitting antenna for transmission based on the differences in the plurality of channel propagation delays and based on the channel matrix, and transmitting, by the transmitter, the preprocessed symbol streams through the plurality of transmitting antennas.

17 Claims, 9 Drawing Sheets

(51) Int. Cl.
*H04B 7/08* (2006.01)
*H04B 7/06* (2006.01)
*H01Q 21/28* (2006.01)

(58) Field of Classification Search
CPC ......... H04B 1/10; H04B 1/1081; H04L 25/08; H01Q 21/28; H01Q 1/288
See application file for complete search history.

(56) References Cited

U.S. PATENT DOCUMENTS

2005/0094719 A1   5/2005   Young
2017/0054583 A1   2/2017   Pratt et al.

\* cited by examiner

MIMO (MULTIPLE-INPUT, MULTIPLE-OUTPUT) INTER-STREAM INTERFERENCE CANCELLATION

RELATED APPLICATIONS

This patent application is a continuation of U.S. patent application Ser. No. 15/389,608 filed Dec. 23, 2016, granted as U.S. Pat. No. 10,084,518 on Sep. 25, 2018, which is herein incorporated by reference.

FIELD OF THE DESCRIBED EMBODIMENTS

The described embodiments relate generally to wireless communications. More particularly, the described embodiments relate to systems, methods and apparatuses for MIMO inter-stream interference cancellation.

BACKGROUND

Wireless networks are being deployed that include long-range propagation of wireless signals. Long-range MIMO (multiple-input, multiple-output) channel wireless systems are subject to different interference conditions than typical short-range MIMO systems, such as, LTE (long term evolution) and WiFi (wireless fidelity) wireless systems.

It is desirable to have methods apparatuses, and systems for cancelling MIMO inter-stream interference.

SUMMARY

An embodiment includes a method. The method includes determining a channel matrix between a plurality of transmitting antennas of a transmitter and a plurality of receiving antennas of a receiver, determining a plurality of channel propagation delays based on a propagation delay between each of the plurality of transmitting antennas and each of the plurality of receiving antennas, preprocessing, by the transmitter, streams of symbols for each transmitting antenna for transmission based on the plurality of channel propagation delays and based on the channel matrix, and transmitting, by the transmitter, the preprocessed symbol streams through the plurality of transmitting antennas.

An embodiment includes another method. The method includes determining a channel matrix between a plurality of transmitting antennas of a transmitter and a plurality of receiving antennas of a receiver, determining a plurality of channel propagation delays based on a propagation delay between each of the plurality of transmitting antennas and each of the plurality of receiving antennas, receiving, through the channel, streams of symbols through each of the plurality of receiving antennas, and processing, by the receiver, the streams of symbols for each receiving antenna based on the plurality of channel propagation delays and based on the channel matrix.

Another embodiment includes a transmitter. The transmitter includes a plurality of radio frequency (RF) chains, wherein the plurality of RF chains is connected to a plurality of transmitting antennas. The transmitter further includes a controller. The controller is operative to determine a channel matrix between the plurality of transmitting antennas and a plurality of receiving antennas of a receiver, determine a plurality of channel propagation delays based on a propagation delay between each of the plurality of transmitting antennas and each of the plurality of receiving antennas, preprocess a stream of symbols for each transmitting antenna for transmission based on the plurality of channel propagation delays and based on the channel matrix, and transmit the preprocessed symbol streams through the plurality of transmitting antennas.

Another embodiment includes a receiver. The receiver includes a plurality of receiving antenna, wherein the plurality of receiving antennas is connected to a plurality of RF chains. The receiver further includes a controller. The controller is operative to determine a channel matrix between a plurality of transmitting antennas of a transmitter and the plurality of receiving antennas of a receiver, determine a plurality of channel propagation delays based on a propagation delay between each of the plurality of transmitting antennas and each of the plurality of receiving antennas, receive streams of symbols through each of the plurality of receiving antennas, and process the streams of symbols for each receiving antenna based on the plurality of channel propagation delays and based on the channel matrix.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for MIMO inter-stream interference cancellation for time-misaligned channels in long-range wireless systems. For at least some embodiments, either symbol streams for transmission through a MIMO system or symbol streams received through a MIMO system are processed using differences in propagation delay between different of a plurality of transmitting antennas and receiving antennas of the MIMO system, and a channel matrix of the MIMO system.

Figure 1A:
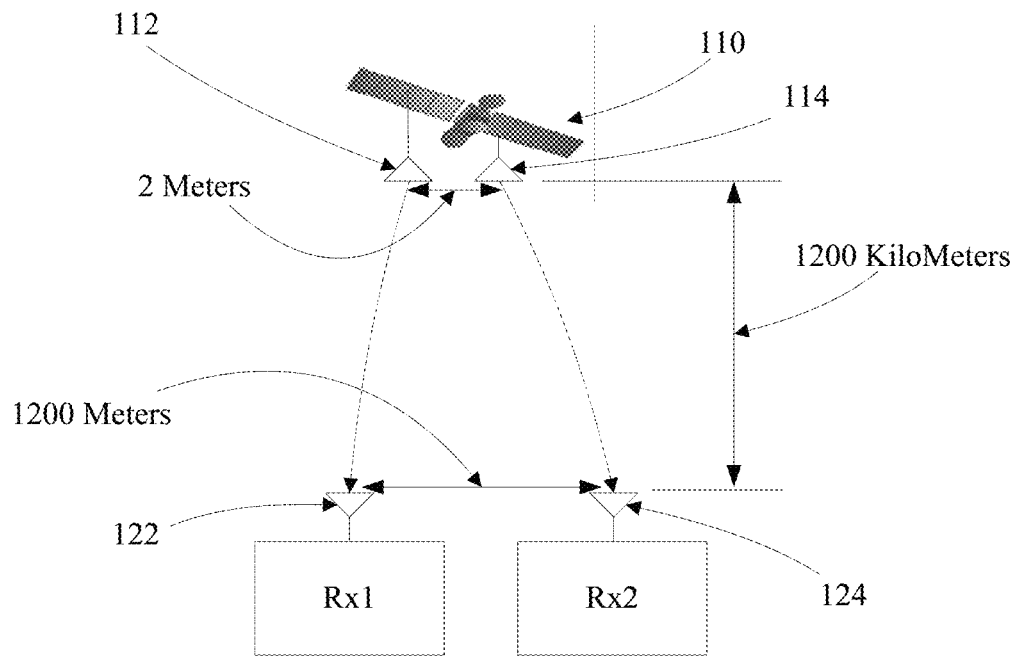
FIG. 1A shows a long-range MIMO system, according to an embodiment.

FIG. 1A shows a long-range MIMO system, according to an embodiment. The embodiment includes a satellite 110 that includes multiple antennas 112, 114, and multiple antennas 122, 124 located on ground. Further, the receiving antennas are physical spaced apart by a large distance. This MIMO system is different than typical MIMO systems in that the distances between the transmitting antenna and the receiving antennas is large, and the antenna spacing is large, and therefore, the difference in the signal flight time between the transmitting antennas and the receiving antennas of the wireless transmission signals is much larger than the time duration of the symbols of symbol streams of the wireless transmission signals. That is, for example, for an embodiment, the in-flight travel time of a symbol transmitted from the antenna 112 of the satellite 110 and received by the antenna 122 on the ground is different than the in-flight travel time of a symbol transmitted from the antenna 114 of the satellite 110 and received by the antenna 122 on the ground by multiples of the time durations of the transmitted symbols. As will be described, this results in time misaligned interference that typical LTE and WiFi systems do not experience. That is, long-range wireless systems can suffer from time misaligned interference due to the misalignment of the received streams due to the differences in in-flight travel times of the different transmitted streams. For an embodiment, a long-range wireless system is a wireless system in which the differences in the in-flight propagation delays of the different streams is greater than a multiple of the time durations of the symbols of the stream of symbols.

For the embodiment shown in FIG. 1A, the exemplary distance between the transmitting antennas and the receiving antennas is 1200 Kilometers and the distance between the receiving antennas (on the ground) is 1200 Meters. As described, the distances traveled by the wireless signal is large enough that the differences in the time traveled by symbol streams transmitted by the different transmitting antennas and received by a receiving antenna is greater than multiple time durations of the symbols of the symbol streams. Further, the satellite is in motion, and therefore, the propagation times can also be changing.

Figure 1B:
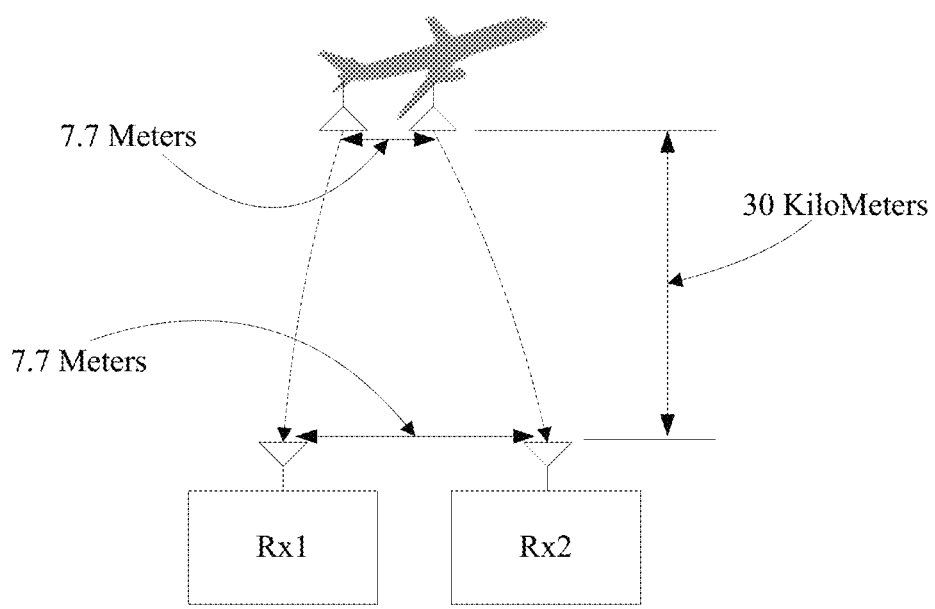
FIG. 1B shows a long-range MIMO system, according to another embodiment.

FIG. 1B shows a long-range MIMO system, according to another embodiment. This embodiment includes a drone cycling over the earth. Similar to the system of FIG. 1A, the distances traveled by the wireless signal is large enough that the differences in the time traveled by symbol streams transmitted by the different transmitting antennas and received by a receiving antenna is greater than the time duration of multiple of the symbols of the symbol streams. Further, the drone is in motion, and therefore, the propagation times can also be changing.

The MIMO systems of the described embodiments can include unique characteristics. For example, for at least some embodiments, the carrier frequencies are as high as 70 to 85 Gigahertz. Further, for at least some embodiments, the distances between the transmitters and the receivers are 30-1200 Kilometers. Further, a separation distance between antennas can be large based on the Rayleigh criteria for a LOS (line-of-sight) MIMO system. The combinations of the large distances result in large propagation delays between the transmitting antennas and the receiving antennas. To satisfy the Rayleigh criteria, the following equation is satisfied:

Dr*Dt=Drt*(lamda/A), wherein Dr is the distance between the receiving antennas, Dt is the distance between the transmitting antennas, Drt is the distance between the transmitter (the transmitting antennas) and the receiver (receiving antennas), lamda is the wavelength of the carrier signal of the transmitted data streams, and wherein A is the minimum of the number of transmitter antennas or the number of receiver antennas. For the two transmitter antenna and two receiver antenna case, A=2.

Channel Matrix

Figure 2:
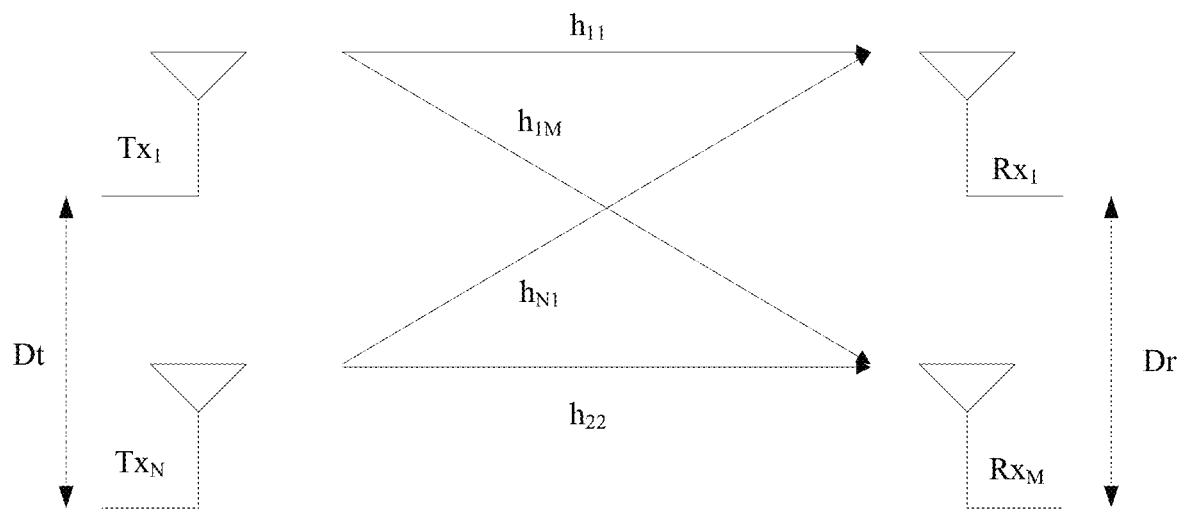
FIG. 2 shows a MIMO system and a channel matrix of the MIMO system, according to an embodiment.

FIG. 2 shows a MIMO system and a channel matrix of the MIMO system, according to an embodiment. Dt represents the physical distance between the transmitting antennas and Dr represents the physical distance between receiving antennas. As shown, a channel matrix H is formed between the transmitting antennas $Tx_1$, $Tx_N$ and the receiving antennas $Rx_1$, $Rx_M$. As shown in FIG. 2, the channel matrix includes the elements $h_{11}$, $h_{1M}$, $h_{N1}$, $h_{22}$. That is, for an ideal LOS MIMO system:

$$H = \begin{bmatrix} h_{11} & \cdots & h_{1M} \\ \vdots & \ddots & \vdots \\ h_{N1} & \cdots & h_{NM} \end{bmatrix} = \begin{bmatrix} \exp(jkd_{11}) & \cdots & \exp(jkd_{1M}) \\ \vdots & \ddots & \vdots \\ \exp(jkd_{N1}) & \cdots & \exp(jkd_{NM}) \end{bmatrix}$$

The channel matrix can be determined, for example, through training of the channel which includes transmitting known pilot symbols and measuring the effects of the channel on the pilot symbols at the receiver. For an embodiment, the channel matrix is determined periodically. For an embodiment, the channel matrix is determined at the receiver, and communicated back to the transmitter. That is, a controller of the transmitter obtains the channel matrix by receiving or retrieving the channel matrix from somewhere else. For an embodiment, reciprocity of the transmission channel is assumed, and the channel matrix is determined by the transmitter. Further, for an embodiment, the propagation delays are determined at the receiver. The transmitter then obtains the propagation delays by accessing the propagation delays from somewhere else. For an embodiment, reciprocity of the propagation delays is assumed, and the transmitter obtains the propagation delays be directly determining the propagation delays.

Figure 3:
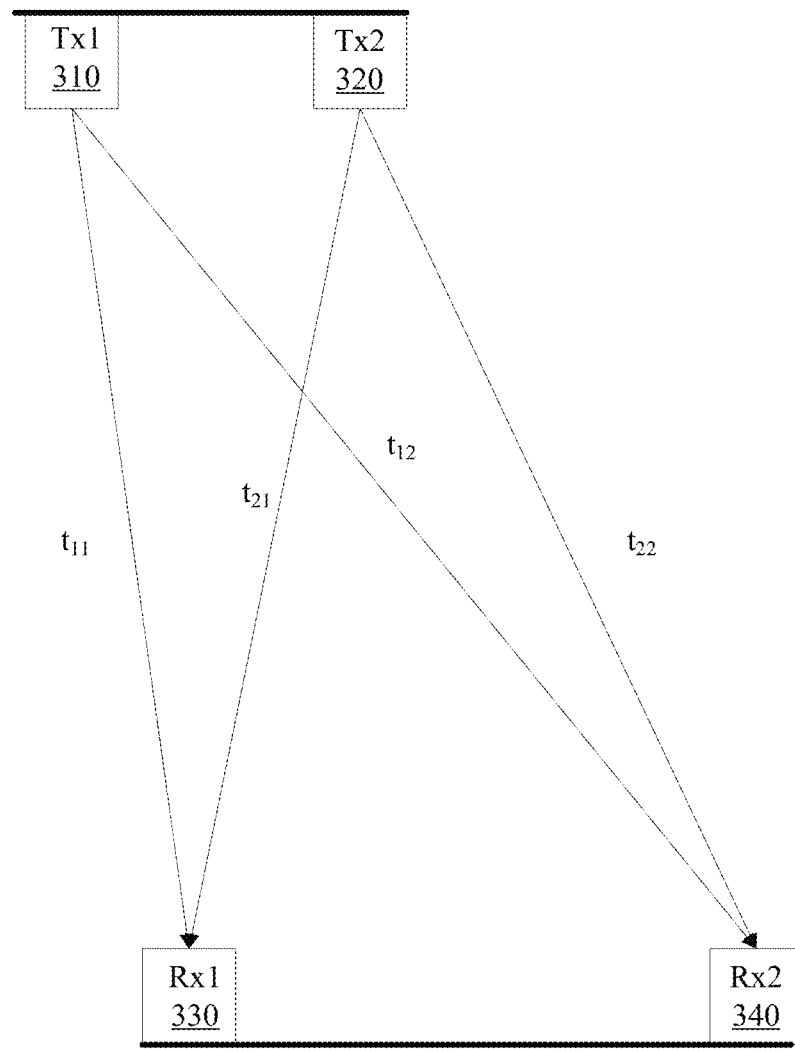
FIG. 3 shows a MIMO system and a propagation delays associated with the MIMO system, according to an embodiment.

FIG. 3 shows a MIMO system and a propagation delays associated with the MIMO system, according to an embodiment. As shown, $t_{11}$ represents a propagation delay of a wireless signal transmitted from transmitting antenna Tx1 310 and received by receiving antenna Rx1 330, $t_{12}$ represents a propagation delay of a wireless signal transmitted from transmitting antenna Tx2 320 and received by receiving antenna Rx1 330, $t_{21}$ represents a propagation delay of a wireless signal transmitted from transmitting antenna Tx1 310 and received by receiving antenna Rx2 340, and $t_{22}$ represents a propagation delay of a wireless signal transmitted from transmitting antenna Tx2 320 and received by receiving antenna Rx2 340.

For the long-range wireless systems shown in FIGS. 1A and 1B, the differences between the propagation travel times are greater than multiple time durations of symbols of symbol streams of the transmitted signals. For example, for the system of FIG. 1A, the difference between propagation delays ($t_{12}-t_{11}$ and $t_{21}-t_{22}$) can be as great as the time duration of 40 symbols of the symbol streams.

The differences in the propagation times can cause undesired interference. For example, the delayed version of the symbol stream transmitted from the transmitting antenna $Tx_2$ can undesirably interfere with the symbol stream transmitted from the transmitting antenna $Tx_1$ and received at the receiving antenna $Rx_1$. That is, as previously described, long-range wireless systems can suffer from time misaligned interference due to the misalignment of the received streams due to the differences in in-flight travel times of the different transmitted streams that typical MIMO LTE (long term evolution) and WiFi (wireless fidelity) systems do not experience. As previously described, for an embodiment, a long-range wireless system is a wireless system in which the differences in the in-flight propagation delays of the different streams is greater than a multiple of the durations of the symbols of the stream of symbols.

The propagation delays $t_{11}$, $t_{12}$, $t_{21}$, and $t_{22}$ can be estimated or measured. For example, based on known locations of the transmitting antennas 310, 320 and known locations of the receiving antennas 330, 340, the distances between each of the transmitting antennas 310, 320, and each of the receiving antennas 330, 340 can be estimated. The propagation delays $t_{11}$, $t_{12}$, $t_{21}$, and $t_{22}$ can be estimated based on the estimated distances. For an embodiment, the locations of the transmitting antennas and/or locations of the receiving antennas are determined by GPS (global positioning system) receivers located at the transmitting antennas and/or the receiving antennas.

For an embodiment, the propagation delays $t_{11}$, $t_{12}$, $t_{21}$, and $t_{22}$ can be estimated or measured by transmitting by each of the transmitting antennas 310, 320 symbols with known characteristics. Signals received by the receiving antennas 330, 340 can be correlated to determine the propagation delays.

Figure 4A:
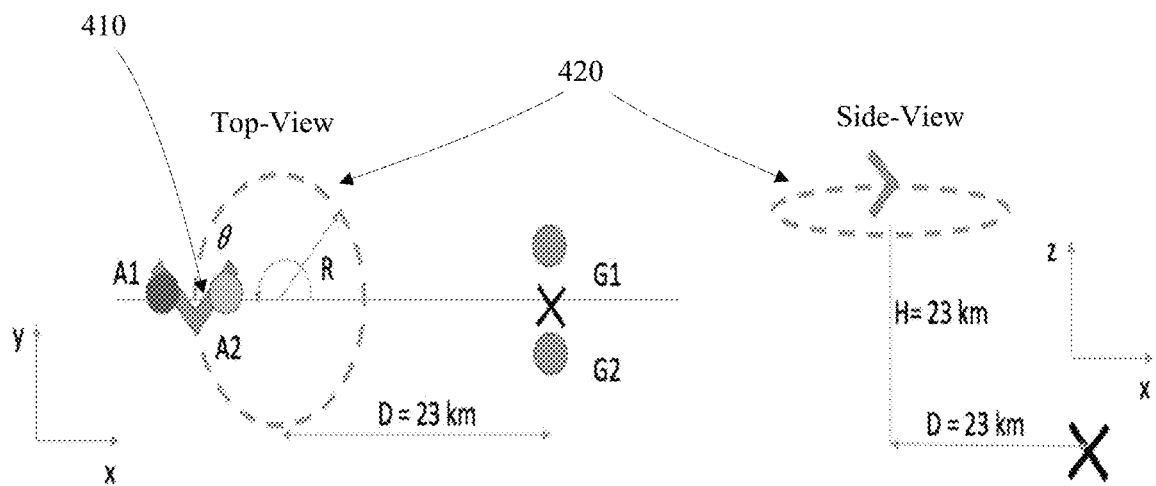
FIG. 4A shows a MIMO long-range system that includes transmitters located on a cycling drone, according to another embodiment.

FIG. 4A shows a MIMO long-range system that includes transmitting antennas A1, A2 located on a cycling drone 410, according to another embodiment. A top-view depicts a radius R of the cycling path 420 of the drone 410. Further, a distance D depicts on offset between the ground location of the receiving antennas G1, G2 and the center point of the cycling path 420 of the drone 410. The side-view depicts the distance H of the cycling drone 410

Figure 4B:
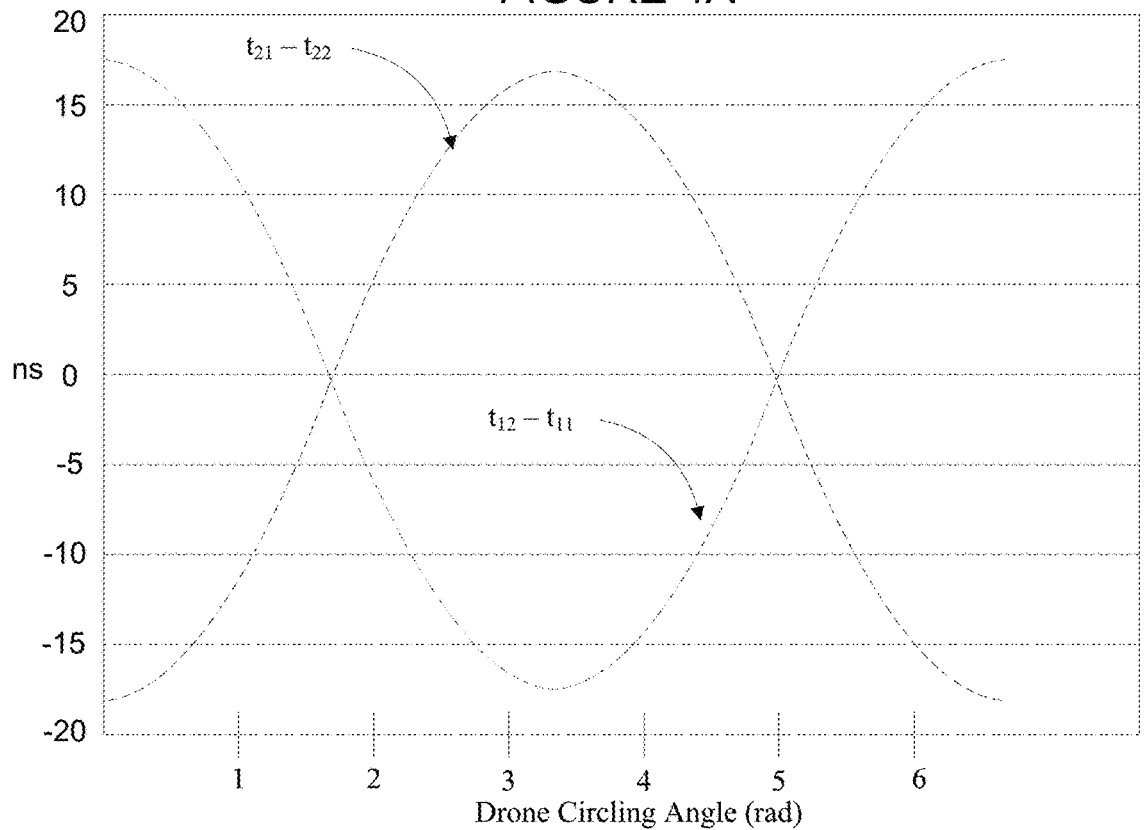
FIG. 4B is a plot that depicts the changing time delay difference between transmitting signals for the cycling drone of FIG. 4A, according to an embodiment.

FIG. 4B is a plot that depicts the changing time delay difference between transmitting signals for the cycling drone of FIG. 4A, according to an embodiment. That is, due to the motion of the drone, the propagation delay times of the transmission signals vary over time. For example, the plots of FIG. 4B show the variation of the differences between $t_{21}-t_{22}$ and $t_{12}-t_{11}$ as the drone circling angle changes as the drone cycles.

For at least some embodiments, the rate at which the differences in the propagation delays change is very small relative to absolute time, and it is easy to perform real-time estimates of the propagation delays. For an embodiment, the propagation delays change less than a predetermined rate. For an embodiment, the rate in which the differences between the propagation delays change is less than a threshold.

Transmitter Preprocessing

For an embodiment, a first stream of symbols is associated with a first transmitting antenna, and a second stream of symbols is associated with a second transmitting antenna. As described, for at least some embodiments, the differences in propagation delay between a first transmitting antenna and a first receiving antenna and a second transmitting antenna and the first receiving antenna is greater than multiple time durations of a symbol in the first and second streams of symbols. As described, for at least some embodiments, the difference in propagation delay between the first transmitting antenna and a second receiving antenna and the second transmitting antenna and the second receiving antenna is greater than multiple time durations of a symbol in the first and second streams of symbols. The transmitting antennas and the receiving antenna are physically located such that this relationship between the propagation delays holds. Clearly, at least some embodiments include N streams of symbols associated with N transmitting antennas.

At least some embodiments include preprocessing, by the transmitter, streams of symbols (assume a stream for each transmit antenna) for transmission based on the plurality of channel propagation delays and based on the channel matrix. As will be described, the propagation delays can be determined in one or more ways. Further, the channel matrix can be determined in one more ways. For an embodiment, once the symbol streams have preprocessed, a least some embodiments include transmitting, by the transmitter, the preprocessed symbols streams through the plurality of transmitting antennas.

For at least some embodiments, the preprocessing, by the transmitter, of a stream of symbols for transmission includes for a symbol stream of each transmitting antenna, linearly combining a scaled version of the symbol stream with a scaled and delayed version of one or more symbol streams of other of the plurality of transmitting antennas, wherein a delay of the delayed version of symbol streams of the other of the plurality of transmitting antennas is determined based on the plurality of channel propagation delays.

For example, for a MIMO system that includes 2 transmitting antennas and 2 receiving antennas, the channel matrix can be given as:

$$H = \begin{bmatrix} h_{11} & h_{12} \\ h_{21} & h_{22} \end{bmatrix};$$

and a precoding matrix T can be given as:

$$T = \begin{bmatrix} c & -a \\ -b & d \end{bmatrix};$$

and the linearly scaled version of the symbol stream combined with a linearly scaled and delayed version of one or more symbol streams of the other of the plurality of transmitting antennas can be given as:

$$s_1 = T(1,:) \times \begin{bmatrix} s_1(t) \\ s_2(t - \Delta t_1) \end{bmatrix}$$

(symbol of the first stream of symbols);

$$s_2 = T(2,:) \times \begin{bmatrix} s_1(t - \Delta t_2) \\ s_2(t) \end{bmatrix}$$

(symbol of the second stream of symbols);
wherein $\Delta t_1 = t_{12} - t_{11}$ and $\Delta t_{21} = t_{21} - t_{22}$.

For an embodiment, T is selected so that:

$$H * T = \begin{bmatrix} 1 & 0 \\ 0 & 1 \end{bmatrix}.$$

Therefore, the first transmitting antenna Tx1 transmits:

$$s_1 = c*s_1(t) - a*s_2(t - (t_{12} - t_{11}));$$

and the second transmitting antenna Tx2 transmits:

$$s_2 = d*s_2(t) - b*s_1(t-(t_{21}-t_{22})).$$

At the receiving antennas, the receive symbol streams are;

$$r_1(t) = h_{11}*c*s_1(t) - h_{12}*b*s_1(t-t_{21}-t_{12}+t_{22}+t_{11});\text{ and}$$

$$r_2(t) = h_{22}*d*s_2(t) - h_{21}*a*s_2(t-t_{21}-t_{12}+t_{22}+t_{11}).$$

For the first receiving antenna, the interference portion of the received symbol $r_1(t)$ is: $-h_{12}*b*s_1(t-t_{21}-t_{12}+t_{22}+t_{11})$.

For the second receiving antenna, the interference portion of the received symbol $r_2(t)$ is: $-h_{21}*a*s_2(t-t_{21}-t_{12}+t_{22}+t_{11})$.

While a 2 transmitting antennas and 2 receiving antennas system has been described, it is to be understood that these descriptions can be extended to include an N×M antenna system.

Figure 5A:
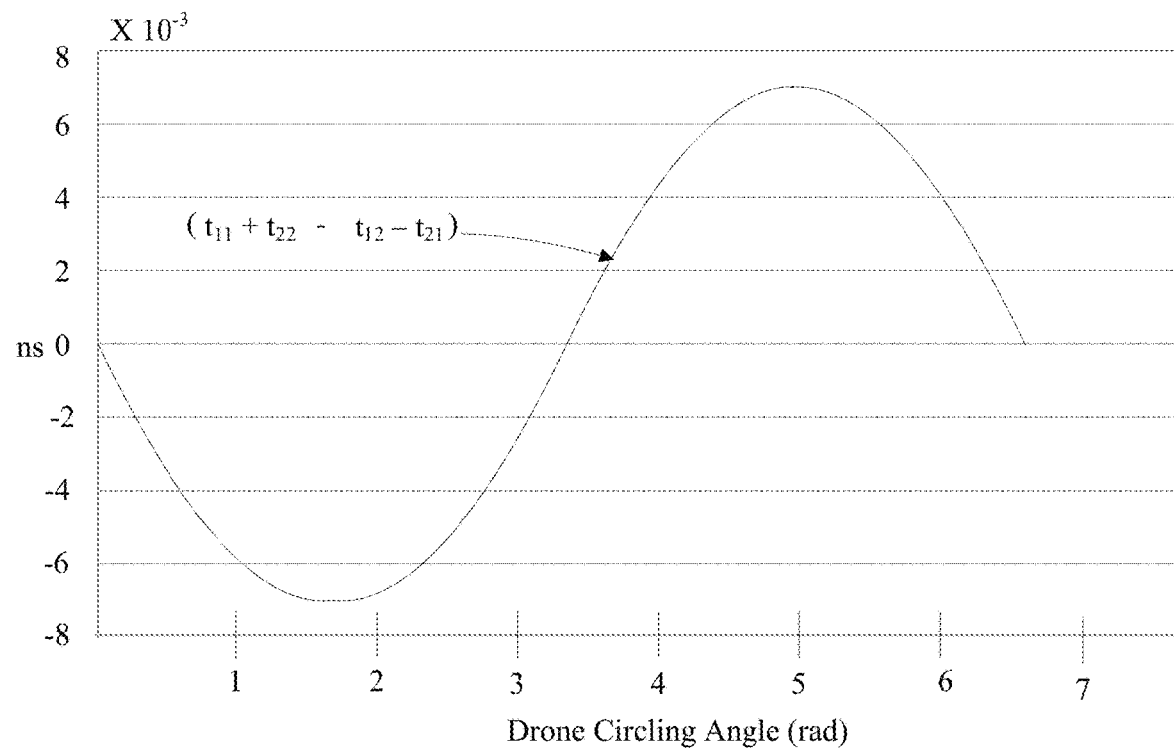
FIG. 5A is a plot that depicts delay times for a multipath component after inter-stream interference cancellation processing, according to an embodiment.

FIG. 5A is a plot that depicts delay times for a multipath component after inter-stream interference cancellation processing, according to an embodiment. That is, FIG. 5A is a plot of the interfering portion for the system of FIG. 1A.

Figure 5B:
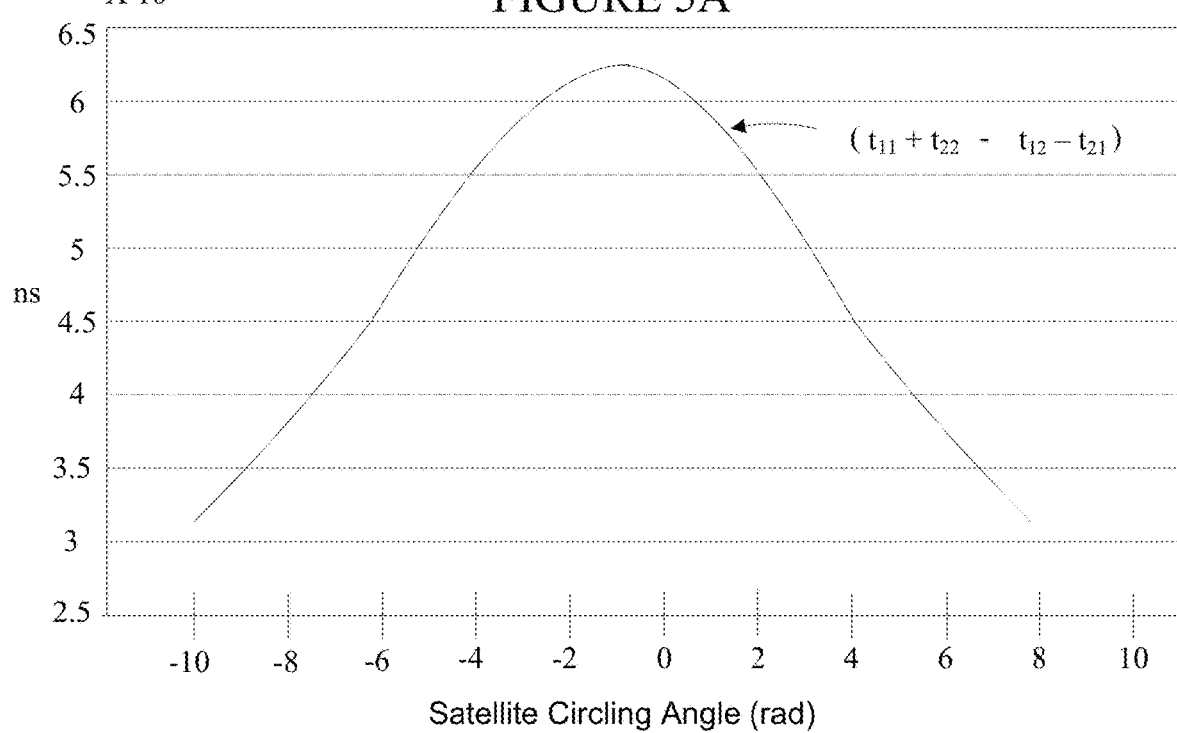
FIG. 5B is a plot that depicts delay times for a multipath component after inter-stream interference cancellation processing, according to an embodiment.

FIG. 5B is a plot that depicts delay times for a multipath component after inter-stream interference cancellation processing, according to an embodiment. That is, FIG. 5B is a plot of the interfering portion for the system of FIG. 1B.

As can be observed from the plots of FIGS. 5A and 5B, the transmit processing reduces the inter-stream interference to be negligible. That is, the inter-stream interference is mitigated (for the ideal case, mathematically eliminated) while introducing a negligible multipath component. That is, the transmit processing reduces interference portions of the reduced signal to be less than a threshold amount.

The values of $(t_{22}+t_{11}-t_{12}-t_{21})$ of FIGS. 5A and 5B are in the orders of picoseconds, whereas the propagation delays for the proposed multiple transmit antennas, multiple receive antennas systems are in the orders of nanoseconds. Accordingly, the inter-symbol interference is reduced to a relatively low (less than a threshold) level. The propagation delays are determined by the physical locations and distances between the transmitter antennas and the receiver antennas. The symbol durations are set buy the communication system. For an embodiment, the communication system includes millimeter wave communication system having a bandwidth of up to 2 GHz and a sampling rate of up to 2 GHz.

Accordingly, for an embodiment, each of the receiving antennas operates independently. That is, each antenna receives a symbol stream and does not need to do any post-processing that is dependent on another symbol stream of another receiving antenna.

Receiver Post-Processing

The dual of the previously described embodiments for preprocessing at the transmitter can alternatively be implemented at the receiver. That is, an embodiment includes receiver processing of received symbols or streams that includes inter-stream interference cancellation.

At least some embodiments include receiving, through the channel, streams of symbols through each of the plurality of receiving antennas, and processing, by the receiver, the streams of symbols for each receiving antenna based on the plurality of channel propagation delays and based on the channel matrix.

Similar to the transmit processing, for an embodiment, the difference in propagation delay between a first transmitting antenna and a first receiving antenna and a second transmitting antenna and the first receiving antenna is greater than multiple time durations of a symbol in the streams of symbols.

For an embodiment, the processing, by the receiver, a stream of symbols includes for each symbol stream of each receiving antenna, linearly combining a scaled version of the symbol stream with a scaled and delayed version of symbol streams of other of the plurality of receiving antennas, wherein a delay of the delayed version of symbol streams of other of the plurality of receiving antennas is determined based on the plurality of channel propagation delays.

Delay Estimation

As previously described, the propagation delays between the transmitting antennas and the receiving antennas can be estimated or measured. For example, based on known locations of the transmitting antennas and known locations of the receiving antennas, the distances between each of the transmitting antennas and each of the receiving antennas can be estimated. If the transmitting antennas or the receiving antennas are in motion, a global positioning system (GPS) can be used to monitor the location of either the transmitting antennas or the receiving antennas. For example, the drone 410 of FIG. 4 can include a GPS receiver that determines the exact location of the transmitting antennas. The receiving antennas may be fixed on the ground. Therefore, the distances between the transmitting antennas and the receiving antennas can be constantly (repeatedly) estimated. The propagation delays can be estimated based on the estimated distances.

As previously described, for an embodiment, the propagation delays $t_{11}$, $t_{12}$, $t_{21}$, and $t_{22}$ can be estimated or measured by transmitting by each of the transmitting antennas 310, 320 symbols with known characteristics. Signals received by the receiving antennas 330, 340 can be correlated to determine the propagation delays.

Figure 6:
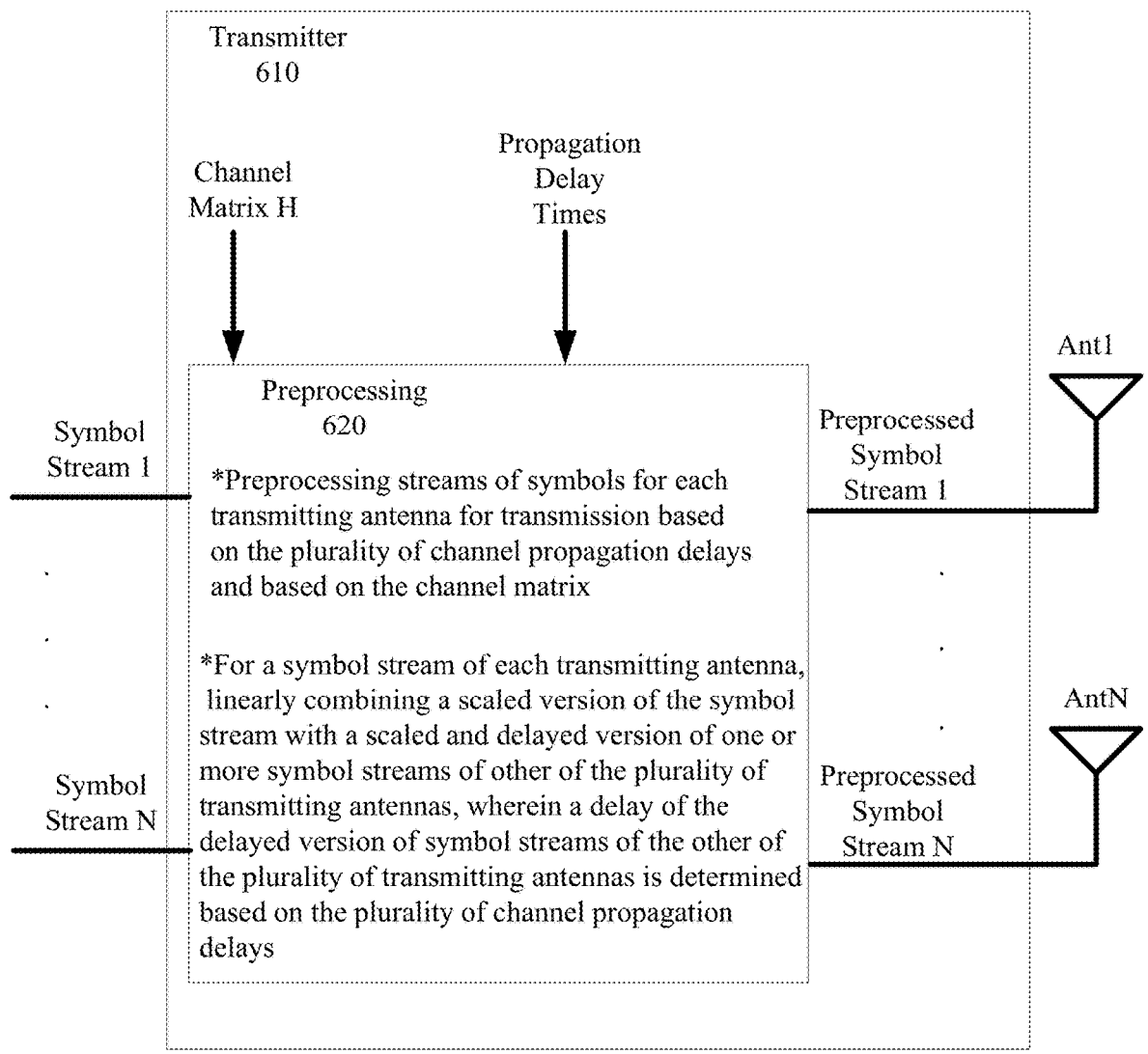
FIG. 6 shows a transmitter that includes transmit preprocessing, according to an embodiment.

FIG. 6 shows a transmitter 610 that includes transmit preprocessing 620, according to an embodiment. For an embodiment, the transmitter 610 receives N symbol streams for transmission. The transmitter 610 preprocesses the N symbol streams based on the estimated propagation delays and the channel matrix. For an embodiment, the preprocessing 620 includes for a symbol stream of each transmitting antenna, linearly combining a scaled version of the symbol stream with a scaled and delayed version of one or more symbol streams of other of the plurality of transmitting antennas, wherein a delay of the delayed version of symbol streams of the other of the plurality of transmitting antennas is determined based on the plurality of channel propagation delays.

The preprocessed symbol streams are then transmitted through transmitting antennas (Ant1-AntN).

Figure 7:
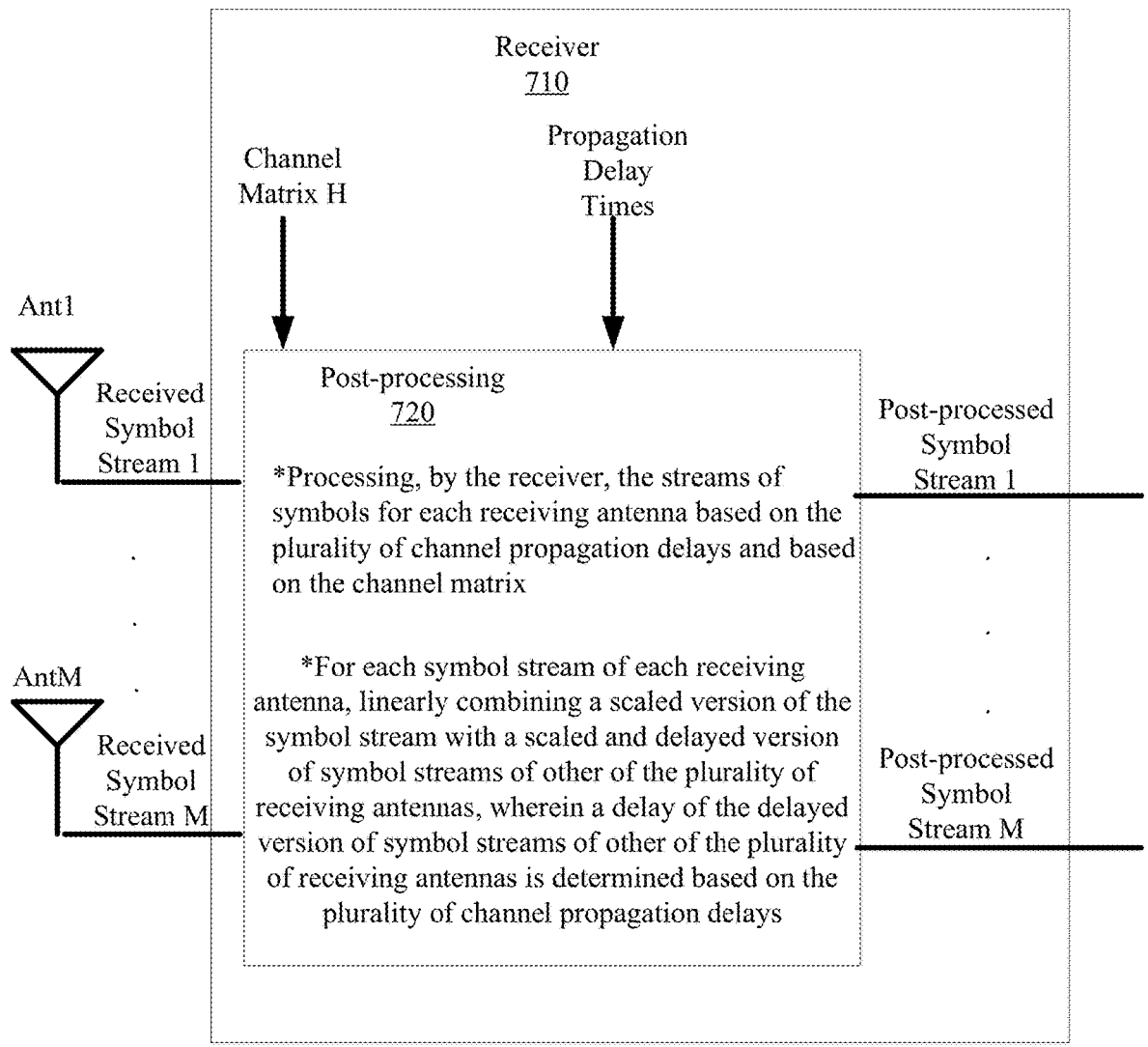
FIG. 7 shows a receiver that includes receive post-processing, according to an embodiment.

FIG. 7 shows a receiver 710 that includes receive post-processing 720, according to an embodiment. It is to be understood that the embodiment of FIG. 7 can be exclusive in operation from the embodiment of FIG. 6. That is, for an embodiment, a system that includes a transmitter and a receiver may include pre-processing of the symbol streams as described, or post-processing of the symbol streams as described.

The receiver 720 receives M symbol streams through receiving antennas (Ant1-AntM). The receiver 720 post-processes the M received symbol streams based on the estimated propagation delays and the channel matrix. For an embodiment, the post-processing includes for each symbol stream of each receiving antenna, linearly combining a scaled version of the symbol stream with a scaled and delayed version of symbol streams of other of the plurality of receiving antennas, wherein a delay of the delayed version of symbol streams of other of the plurality of receiving antennas is determined based on the plurality of channel propagation delays.

Figure 8:
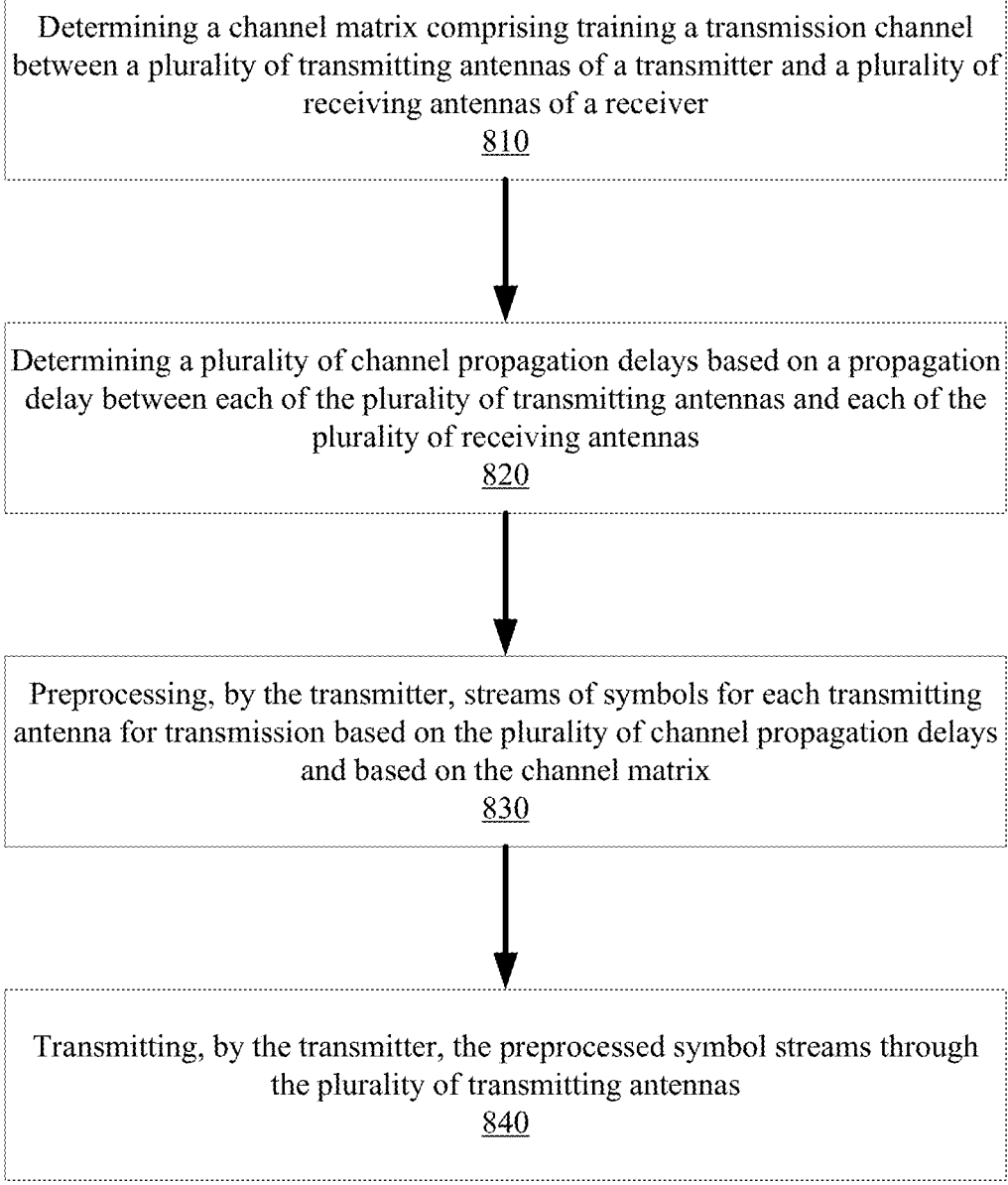
FIG. 8 is a flow chart that includes acts of a method of transmitter preprocessing, according to an embodiment.

FIG. 8 is a flow chart that includes acts of a method of transmitter preprocessing, according to an embodiment. A first step 810 includes determining a channel matrix. For an embodiment, the transmitter receives the channel matrix. For an embodiment, the transmitter retrieves the channel matrix. For an embodiment, the channel matrix is determined by training a transmission channel between a plurality of transmitting antennas of a transmitter and a plurality of receiving antennas of a receiver. For an embodiment, the training includes transmitting known pilot symbols be the transmitting antennas and characterizing the channel based on reception of the known pilot symbols at the receiver of the receiving antennas. The receiver than communicates the channel matrix back to the transmitter.

A second step 820 includes determining a plurality of channel propagation delays based on a propagation delay between each of the plurality of transmitting antennas and each of the plurality of receiving antennas. For an embodiment, the transmitter receives the plurality of channel propagation delays. For an embodiment, the transmitter retrieves the plurality of channel propagation delays. For an embodiment, the determining the propagation delays includes transmitting known pilot symbols be the transmitting antennas and determining the propagation delays based on reception of the known pilot symbols at the receiver of the receiving antennas. The receiver than communicates the propagation delays back to the transmitter.

A third step 830 includes preprocessing, by the transmitter, streams of symbols for each transmitting antenna for transmission based on the plurality of channel propagation delays and based on the channel matrix. A fourth step 840 includes transmitting, by the transmitter, the preprocessed symbol streams through the plurality of transmitting antennas.

For an embodiment, the difference in propagation delay between a first transmitting antenna and a first receiving antenna and a second transmitting antenna and the first receiving antenna is greater than multiple time durations of a symbol in the streams of symbols. Further, for an embodiment, the difference in propagation delay between a second transmitting antenna and a first receiving antenna and the second transmitting antenna and a second receiving antenna is greater that than multiple time durations of a symbol in the streams of symbols.

For at least some embodiments, the preprocessing, by the transmitter, the stream of symbols for transmission includes for a symbol stream of each transmitting antenna, linearly combining a scaled version of the symbol stream with a scaled and delayed version of one or more symbol streams of other of the plurality of transmitting antennas, wherein a delay of the delayed version of symbol streams of the other of the plurality of transmitting antennas is determined based on the plurality of channel propagation delays. For an embodiment, the scaled version of the symbol stream and the scaled version of the symbol streams of other of the plurality of transmitting antennas are determined based on a precoding matrix, wherein the precoding matrix is determined based on the channel matrix. Further, for an embodiment, the precoding matrix is additionally determined based on a zero forcing function. Further, for an embodiment, the precoding matrix is additionally determined based on an SINR (signal to interference and noise ratio) maximization criteria.

A least some embodiments further include independently receiving symbol streams at each of the receiving antennas.

At least some embodiments further include continually estimating a location of one or more of the transmitting antennas, and updating values of the plurality of channel propagation delays.

At least some embodiments further include continually updating values of the plurality of propagation delays comprising transmitting a signal from at least one of the transmitting antennas and correlating versions of signals received at the plurality of receiving antennas.

For at least some embodiments, the plurality of transmitting antennas is located on a flying drone which circles a center point. For at least some embodiments, the plurality of transmitting antennas is located on one or more satellites.

Figure 9:
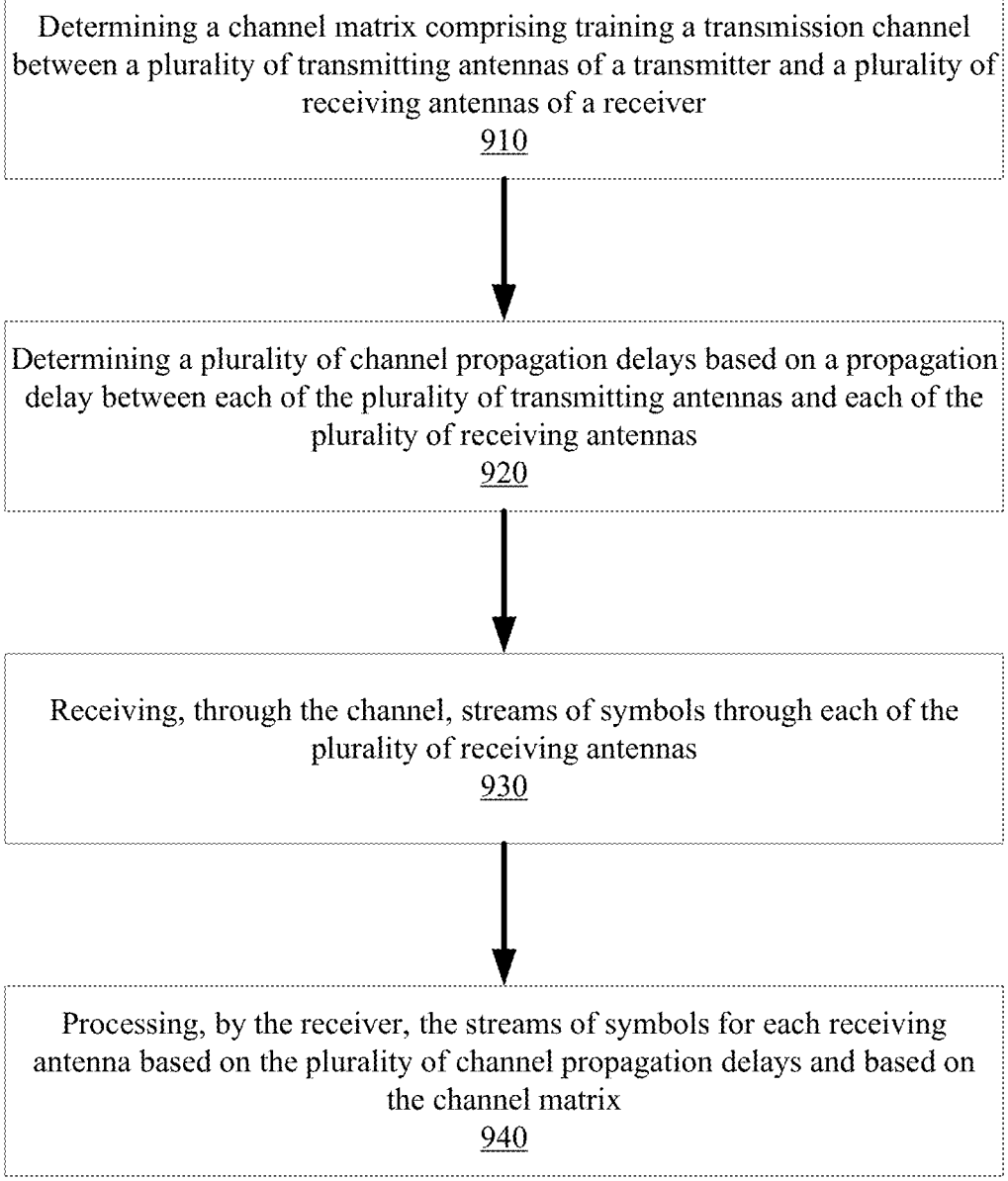
FIG. 9 is a flow chart that includes acts of a method of receiver post-processing, according to an embodiment.

FIG. 9 is a flow chart that includes acts of a method of receiver post-processing, according to an embodiment. A first step 910 includes determining a channel matrix between a plurality of transmitting antennas of a transmitter and a plurality of receiving antennas of a receiver.

A second step 920 includes determining a plurality of channel propagation delays based on a propagation delay between each of the plurality of transmitting antennas and each of the plurality of receiving antennas. A third step 930 includes receiving, through the channel, streams of symbols through each of the plurality of receiving antennas. A fourth step 940 includes processing, by the receiver, the streams of symbols for each receiving antenna based on the plurality of channel propagation delays and based on the channel matrix.

For at least some embodiments, the difference in propagation delay between a first transmitting antenna and a first receiving antenna and a second transmitting antenna and the first receiving antenna is greater than multiple time durations of a symbol in the streams of symbols.

For at least some embodiments, the processing, by the receiver, the stream of symbols includes for each symbol stream of each receiving antenna, linearly combining a scaled version of the symbol stream with a scaled and delayed version of symbol streams of other of the plurality of receiving antennas, wherein a delay of the delayed version of symbol streams of other of the plurality of receiving antennas is determined based on the plurality of channel propagation delays. For an embodiment, the scaled version of the symbol stream and the scaled version of the symbol streams of other of the plurality of receiving antennas are determined based on a precoding matrix, wherein the precoding matrix is determined based on the channel matrix and a zero forcing function.

At least some embodiments further include continually estimating a location of one or more of the transmitting antennas, and updating values of the plurality of channel propagation delays.

At least some embodiments further include continually updating values of the plurality of propagation delays comprising transmitting a signal from at least one of the transmitting antennas and correlating versions of signals received at the plurality of receiving antennas.

For at least some embodiments, the plurality of transmitting antennas is located on a flying drone which circles a center point. For at least some embodiments, the plurality of transmitting antennas is located on one or more satellites.

Although specific embodiments have been described and illustrated, the embodiments are not to be limited to the specific forms or arrangements of parts so described and illustrated. The described embodiments are to only be limited by the claims.

What is claimed:

1. A method, comprising:
   determining a channel matrix between a plurality of transmitting antennas of a transmitter and a plurality of receiving antennas of a receiver;
   determining a plurality of channel propagation delays based on a propagation delay between each of the plurality of transmitting antennas and each of the plurality of receiving antennas;
   preprocessing, by the transmitter, streams of symbols for each transmitting antenna for transmission based on the plurality of channel propagation delays and based on the channel matrix, wherein the preprocessing comprises, for a symbol stream of each transmitting antenna, linearly combining a scaled version of the symbol stream with a scaled and delayed version of one or more symbol streams of other of the plurality of transmitting antennas; and
   transmitting, by the transmitter, the preprocessed symbol streams through the plurality of transmitting antennas.

2. The method of claim 1, wherein a difference in a propagation delay between a first transmitting antenna and a first receiving antenna and a second transmitting antenna and the first receiving antenna is greater than multiple time durations of a symbol in the streams of symbols.

3. The method of claim 1, wherein the scaled version of the symbol stream and the scaled version of the symbol streams of other of the plurality of transmitting antennas are determined based on a precoding matrix, wherein the precoding matrix is determined based on the channel matrix.

4. The method of claim 3, wherein the precoding matrix is determined based on the channel matrix and a selected precoding function.

5. The method of claim 1, further comprising:
   independently receiving symbol streams at each of the receiving antennas.

6. The method of claim 1, further comprising continually estimating a location of one or more of the transmitting antennas, and updating values of the plurality of channel propagation delays based on the estimated location of the one or more transmitting antennas.

7. The method of claim 1, further comprising continually updating values of the plurality of propagation delays, wherein continually updating comprises transmitting a signal from at least one of the transmitting antennas and correlating versions of signals received at the plurality of receiving antennas.

8. The method of claim 1, wherein the plurality of transmitting antennas is located on a flying drone which circles a center point.

9. The method of claim 1, wherein the plurality of transmitting antennas is located on a satellite.

10. A method, comprising:
    determining a channel matrix between a plurality of transmitting antennas of a transmitter and a plurality of receiving antennas of a receiver;
    determining a plurality of channel propagation delays based on a propagation delay between each of the plurality of transmitting antennas and each of the plurality of receiving antennas;
    receiving, through the channel, streams of symbols through each of the plurality of receiving antennas; and
    processing, by the receiver, the streams of symbols for each receiving antenna based on the plurality of channel propagation delays and based on the channel matrix, wherein the processing comprises, for a symbol stream of each transmitting antenna, linearly combining a scaled version of the symbol stream with a scaled and delayed version of one or more symbol streams of other of the plurality of transmitting antennas.

11. The method of claim 10, wherein a difference in a propagation delay between a first transmitting antenna and a first receiving antenna and a second transmitting antenna and the first receiving antenna is greater than multiple time durations of a symbol in the streams of symbols.

12. The method of claim 10, wherein the scaled version of the symbol stream and the scaled version of the symbol streams of other of the plurality of receiving antennas are determined based on a precoding matrix, wherein the precoding matrix is determined based on the channel matrix.

13. The method of claim 10, further comprising continually estimating a location of one or more of the transmitting antennas, and updating values of the plurality of channel propagation delays based on the estimated location of the one or more transmitting antennas.

14. The method of claim 10, further comprising continually updating values of the plurality of propagation delays, wherein continually updating comprises transmitting a signal from at least one of the transmitting antennas and correlating versions of signals received at the plurality of receiving antennas.

15. The method of claim 10, wherein the plurality of transmitting antennas is located on a flying drone which circles a center point.

16. The method of claim 10, wherein the plurality of transmitting antennas is located on a satellite.

17. A transmitter, comprising:
    a plurality of radio frequency (RF) chains, wherein the plurality of RF chains is connected to a plurality of transmitting antennas;
    a controller, the controller operative to:
      determine a channel matrix between the plurality of transmitting antennas and a plurality of receiving antennas of a receiver;
      determine a plurality of channel propagation delays based on a propagation delay between each of the plurality of transmitting antennas and each of the plurality of receiving antennas;
      preprocess a stream of symbols for each transmitting antenna for transmission based on the plurality of channel propagation delays and based on the channel matrix, wherein the preprocessing comprises, for a symbol stream of each transmitting antenna, linearly combining a scaled version of the symbol stream with a scaled and delayed version of one or more symbol streams of other of the plurality of transmitting antennas; and
      transmit the preprocessed symbol streams through the plurality of transmitting antennas.

* * * * *